United States Patent [19]

Schweizer

[11] 4,138,123
[45] Feb. 6, 1979

[54] RECORD CLEANING DEVICE

[76] Inventor: Eduard H. Schweizer, 5101 Boarshead Rd., Minnetonka, Minn. 55343

[21] Appl. No.: 736,473

[22] Filed: Oct. 28, 1976

[51] Int. Cl.² ............................................. G11B 3/58
[52] U.S. Cl. ..................................................... 274/47
[58] Field of Search .......................................... 274/47

[56] References Cited

U.S. PATENT DOCUMENTS

| 1,202,428 | 10/1916 | Rennell | 274/47 |
| 1,318,145 | 10/1919 | Harbaugh | 274/47 |
| 1,423,523 | 7/1922 | Grow | 274/47 |
| 3,486,757 | 12/1969 | Loescher | 274/47 |

FOREIGN PATENT DOCUMENTS

| 828,601 | 1/1952 | Fed. Rep. of Germany | 274/47 |
| 643925 | 9/1950 | United Kingdom | 274/47 |
| 817598 | 8/1959 | United Kingdom. | |

OTHER PUBLICATIONS

Booklet, "Schweiger Design"—Record & Tape Cleaning Products—1974/75, pp. 7 & 8.

Primary Examiner—Harry N. Haroian
Attorney, Agent, or Firm—Wicks & Nemer

[57] ABSTRACT

Record cleaning device is shown in its preferred form for use with a turntable. The record cleaning device includes, in the preferred embodiment, a vertical member, a horizontal member, and a brush holder including means for receiving a brush. The horizontal member is pivotally mounted for movement in a horizontal plane about the vertical member at a single, preset vertical spacing and is prevented from pivoting in a vertical direction. The brush holder is slidably and adjustably vertically mounted to the horizontal member. Therefore, the brush can follow the grooves of the record as it revolves on the turntable platter to clean the record and only the weight of the brush and the brush holder is transferred to the record.

6 Claims, 4 Drawing Figures

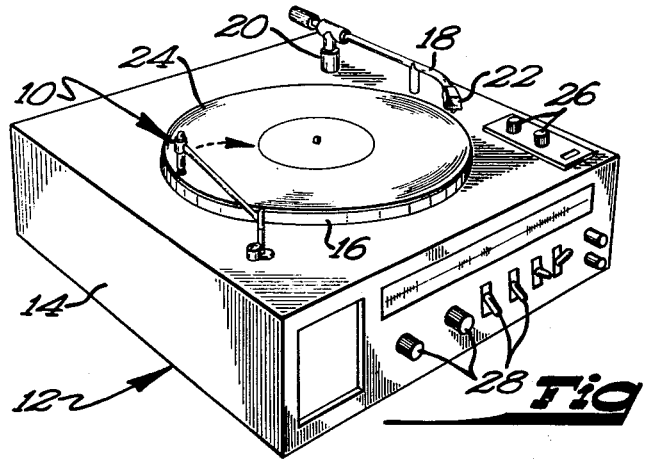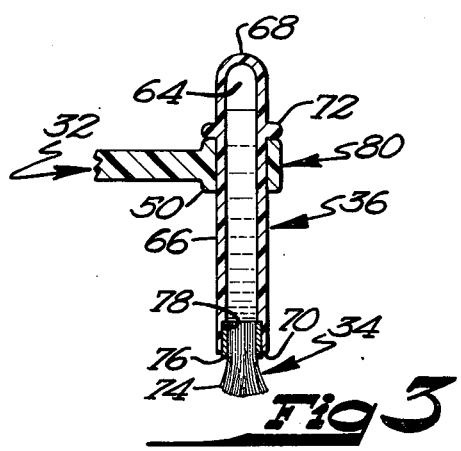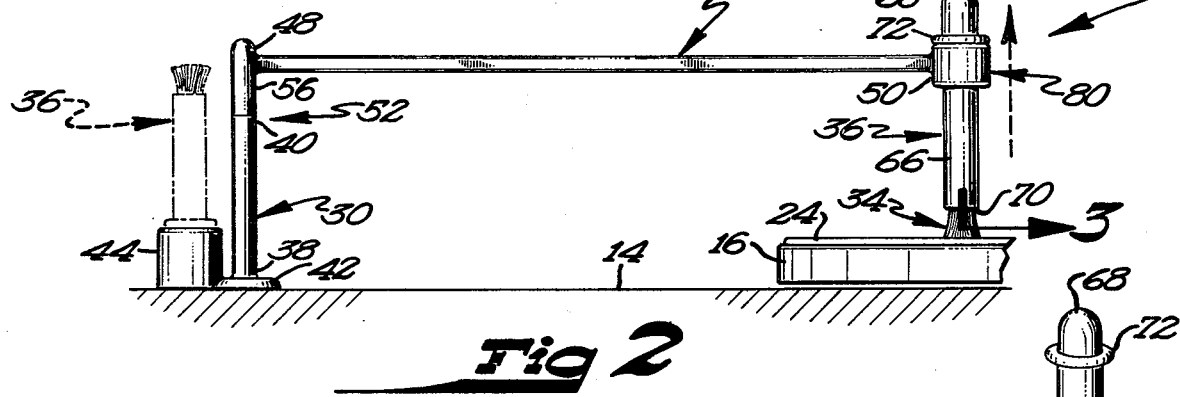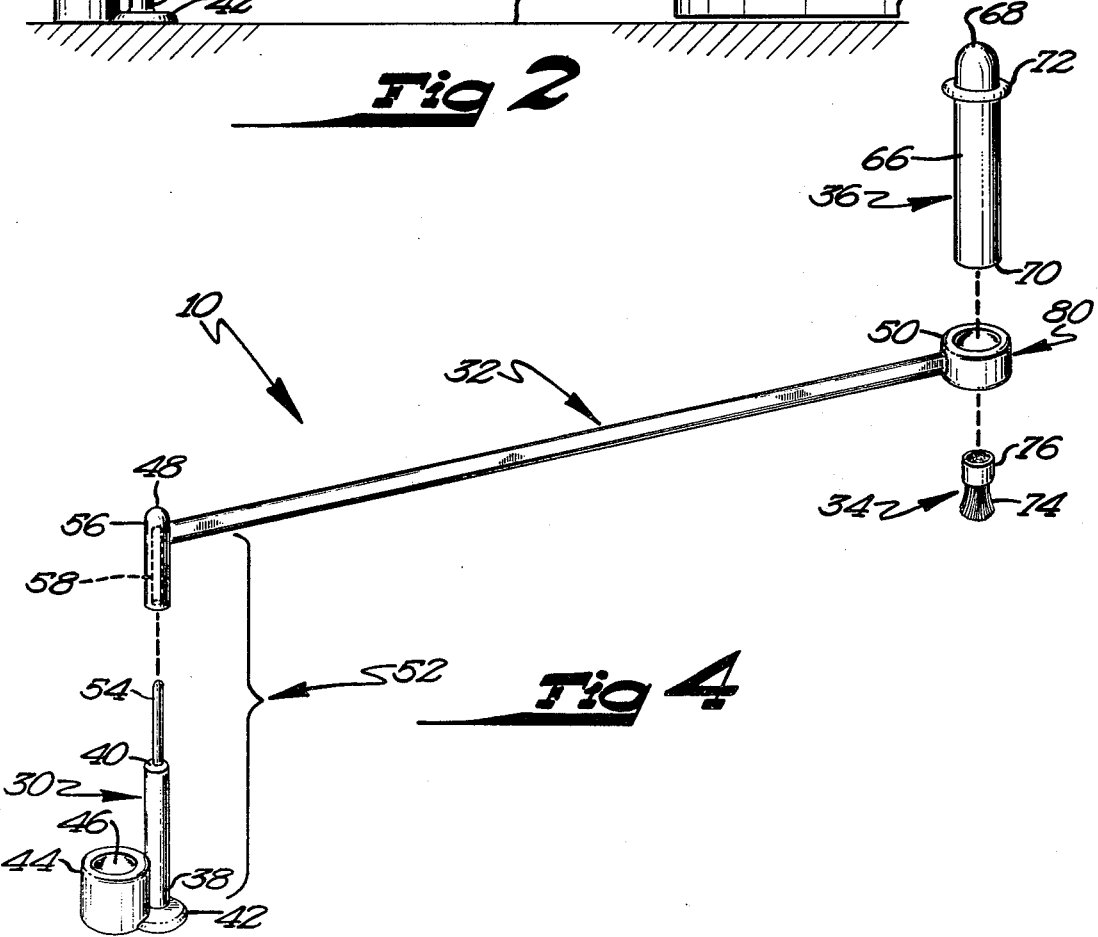

RECORD CLEANING DEVICE

BACKGROUND

The present invention relates generally to record cleaning devices and specifically to record cleaning devices for use with a turntable.

With the increasing use of stereophonic and other recorded media equipment, persons have an increasing awareness of the care and preservation required of the recorded medium in the form of delicate phonograph records. Therefore, a need has arisen for devices for cleaning records. Further, such record cleaning devices should be of a simple design, easy to use, and maximize the material used.

It is thus an object of the present invention to provide novel record cleaning device.

It is further an object of the present invention to provide such novel record cleaning device which maximizes the materials used.

It is further an object of the present invention to provide such novel record cleaning device which are of simple design and can be manufactured at a low cost.

These and further objects and advantages of the present invention will become clearer in light of the following detailed description of an illustrative embodiment of this invention described in connection with the drawings.

DESCRIPTION OF THE DRAWINGS

The illustrative embodiment may best be described by reference to the accompanying drawings where:

FIG. 1 shows a perspective view of a record cleaning device, according to the teachings of the present invention, in use with a turntable.

FIG. 2 shows a side view of the record cleaning device of FIG. 1.

FIG. 3 shows a cross sectional view of the record cleaning device of FIG. 1 according to the section line 3—3 of FIG. 2.

FIG. 4 shows an exploded perspective view of the record cleaning device of FIG. 1.

All figures are drawn for ease of explanation of the basic teachings of the present invention only; the extensions of the figures with respect to number, position, relationship, and dimensions of the parts to form a perferred embodiment will be explained or will be obvious from the explanation set out.

Where used in the various figures of the drawings, the same numerals designate the same or similar parts. Furthermore, when the terms "right", "left", "first", "second", "horizontal", "vertical", and similar terms are used herein, it should be understood that these terms have reference only to the structure shown in the drawings as it would appear to a person viewing the drawings and they are utilized only to facilitate describing the present invention.

DESCRIPTION

In FIG. 1, a record cleaning device according to the present invention, generally designated 10, is shown in use with a turntable 12. Turntable 12 includes a base member 14, a platter 16 mounted for revolving movement upon base 14 in response to a motor, not shown, and allowing placement of a record 24 thereon, a tone arm 18 for pivotal movement about a vertical post 20 and including a stylus member 22 for following the groove of record 24, and suitable controls 26 for controlling tone arm 18 and the motor of platter 16. It should then be noted that in the preferred embodiment, record 24 has a horizontal orientation and device 10 is described with respect to this orientation. Base 14 can further include controls 28 for the control of various electronic equipment such as amplifiers, as is well known in the art.

Device 10 includes a vertical member 30, a horizontal member 32, a brush 34, and a brush holder 36. Vertical member 30 includes a first end 38 and a second end 40. Member 42, arranged for attaching first end 38 of vertical member 30 to a stationary point with respect to platter 16 of turntable 12, is further included. In the preferred embodiment, attaching member 42 is shown as a circular base member which can be secured to base 14 of turntable 12 by any suitable means, such as by adhesive. Device 10 may further include a member 44 attached to attaching member 42 of member 30 and having a cavity 46 formed therein for purposes that will be explained further hereinafter.

Horizontal member 32 includes a first end 48 and a second end 50. A member 52 is further included for pivotally mounting first end 48 of horizontal member 32 to second end 40 of vertical member 30 at a single, preset spacing from first end 38 of vertical member 30 or, in other words, from base 14, for movement in a horizontal plane and for holding horizontal member 32 in a rigid manner and from pivoting in a vertical direction, with second end 50 of horizontal member 32 being horizontally spaced from vertical member 30. In the preferred embodiment, member 52 includes an upwarly vertically directed pivot shaft 54 attached to second end 40 of vertical member 30 and a downwardly directed pivot boss 56 attached to first end 48 of horizontal member 32 having a like vertically directed cavity 58 formed therein for receiving shaft 54. Therefore, boss 56 rests upon and is supported by second end 40 of vertical member 30 with shaft 54 being located within cavity 58 of boss 56 such that boss 56 is freely revolvable in only a horizontal plane about shaft 54 upon vertical member 30. It should then be noted that due to shaft 54 being located within cavity 58 of boss 54, horizontal member 32 is held in a rigid manner from pivoting in a vertical direction out of the horizontal pivot plane and therefor member 30 receives the weight of horizontal member 32 as explained further hereinafter.

In the preferred embodiment, brush holder 36 includes a chamber 64 for receiving liquid record cleaning fluid in communication with brush 34. In the preferred form, brush holder 34 is formed by a tubing member 66 having a circular cross section and having a first domed end 68 and a second open end 70. The interior of tubing member 66 forms chamber 64 and first end 68 is fluid sealed to prevent the record cleaning fluid from escaping therethrough. First end 68 may further include rib member 72 for purposes explained hereinafter.

Brush 34 includes bristles 74 and a circular back member 76 located around the top of bristles 74. Brush holder 36 includes member 78 for receiving brush 34 and specifically includes a circular recess 78 formed in open end 70 for receiving back member 76 of brush 34. It should then be noted that back member 76 provides a fluid seal with member 78 such that the record cleaning fluid will not escape from chamber 64 except for its communication with bristles 74 of brush 34.

Member 80 for slidably and adjustably vertically mounting brush holder 36 to second end 50 of horizontal member 32 is further included in device 10. In the preferred form, member 80 is a ring member having a diameter approximately equal to the outer diameter of the cross section of tubing member 66 forming brush holder 36. Therefore, brush holder 36 is freely slidable and adjustable vertically within member 80.

In the preferred embodiment, cavity 46 of member 44 has a shape complementary to the shape of first end 68 of brush holder 36 such that first end 68 of brush holder 36 can be placed within cavity 46, with brush holder 36 in an inverted position, as seen in phantom in FIG. 2, when not in use. It should be noted that rib 72 rests on and is supported by the top surface of member 44 when first end 68 is thusly located within cavity 46. It should be further noted that rib 72 prevents brush holder 36 from falling through member 80, for example, if horizontal member 32 is pivoted to a location where brush holder 36 is not located over platter 16.

It should further be noted that horizontal member 32 is located within a horizontal pivot plane at a single, preset vertical spacing from first end 38 of vertical member 30 and therefor member 30 receives the weight of horizontal member 32 as explained further hereinafter. Therefore, horizontal member 32 is located at that single, preset spacing from base 14 for any turntable whatever the thickness of platter 16 thereof. The difference of the thicknesses of platter 16 of different brands of turntable is then taken into account by member 80 and brush holder 36 in that brush holder 36 is slidably and adjustably vertically mounted such that brush holder 36 will be located at its lowest position, as shown in solid in FIG. 2, for very thin platter 16 and will be located in raised vertical positions, as shown in phantom in FIG. 2, for turntable platters 16 of greater thicknesses.

Likewise, member 80 and brush holder 36 allow several records 24 to be stacked on platter 16 when turntable 12 includes an automatic record changer in that the level of the top surface of the record 24 being cleaned will vary as the number of records 24 located on platter 16 changes.

Apparatus prior to the present invention included complicated members allowing the horizontal arm to also pivot in a vertical plane. Therefore, at least a part of the weight of the horizontal arm was placed on the record. To avoid this, certain apparatus was used including counter balancing weights in a manner similar to those used in tone arms of turntables.

Many prior known apparatus were very costly in that they required several parts and required extended hand labor in assembling. Device 10 of the present invention, in contradistinction, consists of only four easily molded pieces and brush 34 which can be easily assembled with a minimum of labor, even by the intended ultimate user. Device 10 does not require that horizontal member 32 be raised or lowered and therefore does not require the complicated, and often unworkable, members used in the prior art due to member 80 and brush holder 36.

In device 10 of the present invention, the weight of horizontal member 32 is not placed on record 24 as in apparatus of the prior art. Horizontal member 32 is allowed to pivot only within a horizontal plane and is held in a rigid manner from pivoting in a vertical direction out of the horizontal pivot plane. The entire weight of horizontal member 32 is supported and accepted by vertical member as the result of member 52 and none of the weight of horizontal member 32 is placed on record 24.

OPERATION

For the sake of example, it will be assumed that member 42 has been attached to turntable 12 in the position as shown in FIG. 1 and that brush holder 36 is located in the position as shown in phantom in FIG. 2. When it is desired to use device 10 of the present invention, horizontal arm 32 is pivoted within the horizontal pivot plane with respect to vertical member 30 by member 52 such that member 80, located on second end 50 of member 32, is positioned directly above the beginning portions of record 24.

At this time, if it is desired to use liquid record cleaning fluid, brush 34 is removed from brush holder 36 such that chamber 64, or in other words the interior of tubing 66, is open. Suitable liquid record cleaning fluid can then be added to chamber 64 and brush 34 reinserted into brush holder 36. It should be noted that the liquid record cleaning fluid in chamber 64 is then in fluid communication with bristles 74 of brush 34.

It should be noted that brush 34 can be used in a dry condition also. Therefore, record cleaning fluid is not required to be added to chamber 64 of brush holder 36 at this stage. The following steps of operation of device 10 are then applicable whether or not liquid cleaning fluid is used.

Brush holder 36 can then be positioned within member 80 and slowly lowered through member 80 until bristles 74 of brush 34 engages record 24. The user can then remove his fingers from brush holder 36 and allow brush holder 36 to float on record 24. It should be noted that bristles 74 of brush 34 will then follow the inward spiral groove located on the upper surface of record 24 in a similar manner as stylus 22 of tone arm 18 as record 24 revolves upon platter 16 of turntable 12.

It should then be noted that only the weight of brush 34 and brush holder 36 is transferred to record 24 in that the entire weight of horizontal member 32 is subjected to vertical member 30 due to member 52 holding horizontal member 32 in a rigid manner for preventing horizontal member 32 from pivoting in a vertical direction.

It should then also be noted, that tone arm 18 can be positioned on record 24 such that stylus 22 also follows the inward spiral grooves of record 24 simultaneously with the inward movement of brush 34 of device 10, in the conventional manner and for the conventional purpose.

When brush 34 is located within the interior of record 24, i.e. the record has been played, the user can slowly raise brush holder 36 vertically upward out of member 80 and reposition brush holder 36 within member 44 as seen in phantom in FIG. 2. At that time, horizontal member 32 can be pivoted about vertical member 30 such that horizontal member 32 is moved from a position over platter 16 and out of the way for allowing removal of record 24 from platter 16.

Now that the basic teachings of the present invention have been explained, many extensions and variations will be obvious to one having ordinary skill in the art. For example, although in the preferred embodiment brush 34 and brush holder 36 are shown as being formed from separate pieces, it will be immediately obvious to one having ordinary skill in the art that brush holder 36 and brush 34 can be formed as a single unit.

Likewise, other types of brushes 34 and brush holders 36 can be used, including other types of fluid fill techniques, brush fluid communication techniques, or dry brushes not utilizing record cleaning fluid and all are intended to be embraced herein as defined by the appended claims.

Thus since the invention disclosed herein may be embodied in other specific forms without departing from the spirit or the general characteristics thereof, some of which forms have been indicated, the embodiments described herein are to be considered in all respects illustrative and not restrictive. The scope of the invention is indicated by the appended claims, rather than by the foregoing description, and all changes which come within the meaning and range of equivalency of the claims are intended to be embraced therein.

What is claimed is:

1. Record cleaning device for use with a turntable platter allowing the placement of a record having grooves thereon in a preset orientation comprising, in combination: a member arranged vertically with respect to the record orientation having a first end and a second end; means arranged for attaching the first end of the vertical member to a stationary point with respect to the turntable platter; a member arranged horizontally with respect to the record orientation having a first end and a second end; means for pivotally mounting the first end of the horizontal member to the second end of the vertical member for pivoting the horizontal member within a horizontal pivot plane with respect to the record orientation at a single, preset vertical spacing with respect to the record orientation from the first end of the vertical member and for holding the horizontal member in a rigid manner from pivoting in a vertical direction with respect to the record orientation out of the horizontal pivot plane with respect to the record orientation and with the second end of the horizontal member being spaced horizontally with respect to the record orientation from the vertical member; with the pivotally mounting and holding means comprising, an upwardly vertically directed pivot shaft attached to the second end of the vertical member, and a pivot boss attached to the first end of the horizontal member and having a vertically downwardly directed cavity formed therein for receiving the pivot shaft such that the pivot boss rests upon and is supported by the second end of the vertical member and the pivot shaft is located within the pivot cavity; a brush; a brush holder including means for receiving the brush; means for slidably and adjustably vertically mounting the brush holder to the second end of the horizontal member wherein the device can be positioned adjacent to the turntable platter such that the brush can be placed on the record to follow the grooves inwardly of the record as the platter revolves, and can be used when the level of the record top surface changes thus allowing different vertical heights of the brush, and transfers only the weight of the brush holder and brush to the record.

2. The device of claim 1 wherein the brush holder includes a chamber for receiving liquid record cleaning fluid in communication with the brush.

3. The device of claim 1 wherein the brush holder includes an end having a shape and wherein the device further includes a member with a cavity having a shape complementary to the shape of the end of the brush holder such that the end of the brush holder can be placed within the cavity and such that the brush holder is in an inverted position.

4. The device of claim 1 wherein the slidably and adjustably vertically mounting means comprises, in combination: a ring member wherein, the brush holder is freely slidable and adjustable vertically within the ring member.

5. The device of claim 4 wherein the brush holder includes an end having a shape and wherein the device further includes a member with a cavity having a shape complementary to the shape of the end of the brush holder such that the end of the brush holder can be placed within the cavity and such that the brush holder is in an inverted position.

6. The device of claim 4 wherein the brush holder includes a chamber for receiving liquid record cleaning fluid in communication with the brush.

* * * * *